United States Patent Office 2,802,490
Patented Aug. 13, 1957

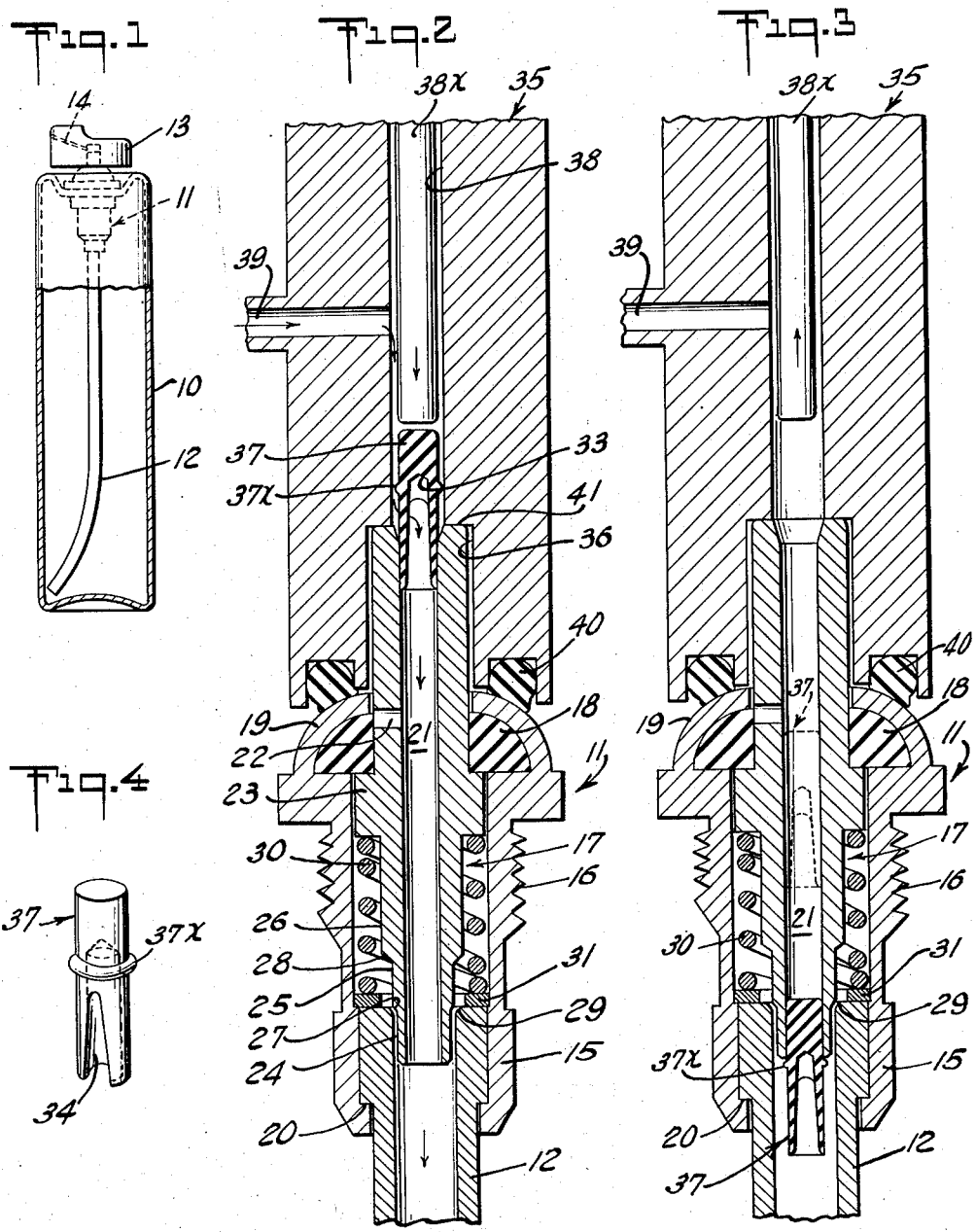

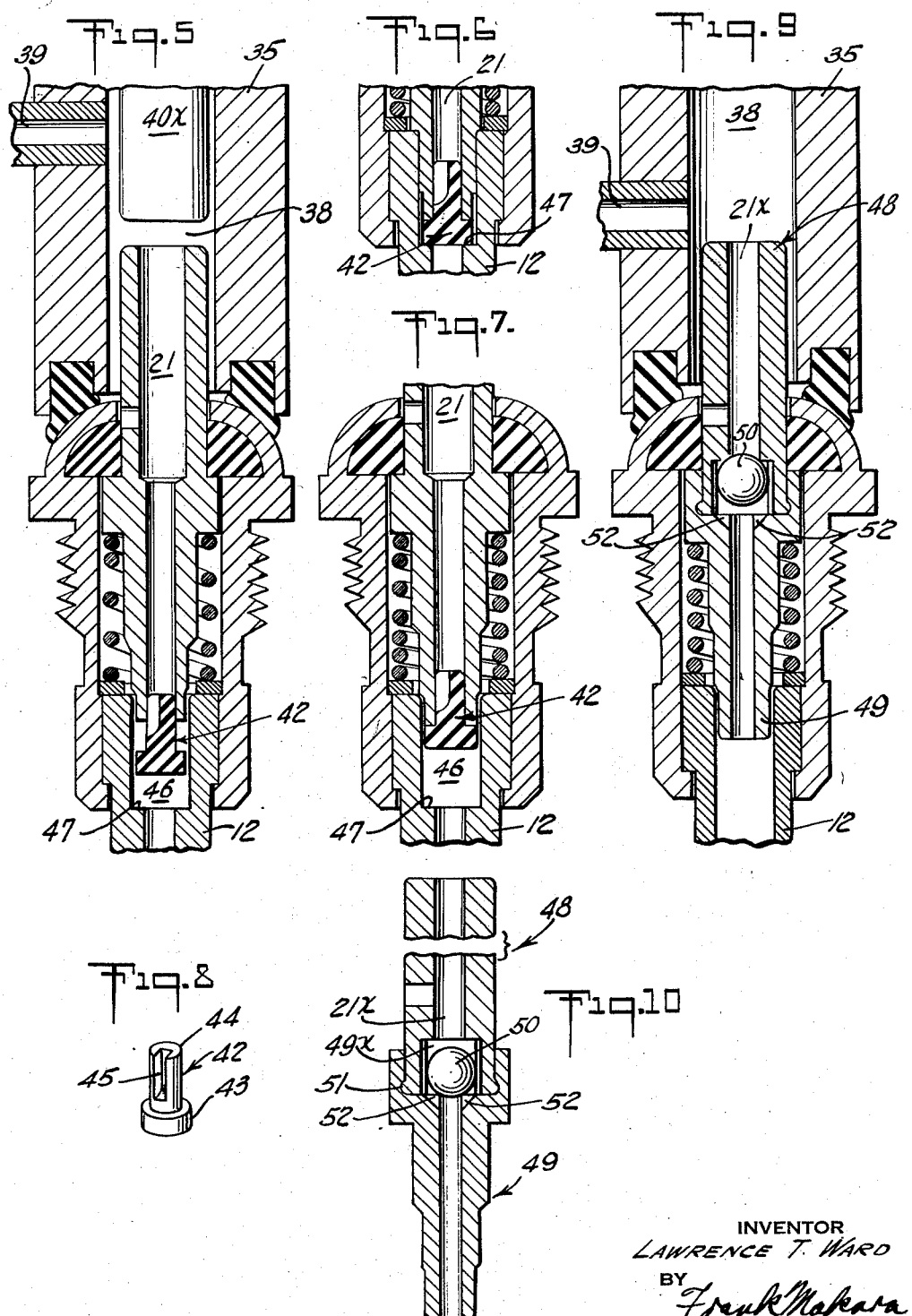

2,802,490
CONTAINER FILLING SPRAY VALVE

Lawrence T. Ward, Portland, Pa.

Application August 16, 1954, Serial No. 450,174

5 Claims. (Cl. 141—20)

This invention relates to a spray valve adapted to dispense liquid propellant and more particularly to a spray valve adapted for filling a container for propellant through the valve plunger.

It is an object of this invention to provide a spray valve fillable through the valve plunger or stem.

It is another object of this invention to provide a container having a spray valve secured thereto and adapted for filling the container with fluid propellant.

It is a further object of this invention to provide a metered spray valve with a plunger having a conduit therethrough and provided with a resilient filler plug.

It is another object of this invention to provide a metered spray valve having ball valve means adapted to permit unidirectional passage of filling fluid.

These and other objects of this invention will become apparent upon reading the following disclosure taken in conjunction with the accompanying drawing in which:

Fig. 1 is a side view, broken away in part, of a perfume sprayer having a metering valve secured thereto, Fig. 2 is a vertical section view through a metering valve of this invention and through a filling head disposed thereon and showing the location of the filling plug during the filling operation, Fig. 3 is a vertical section view similar to Fig. 2 but showing the filling plug seated in place in closed position and further showing in dotted outline an optional location for seating the filling plug, Fig. 4 is a perspective view of a filler plug, Fig. 5 is a vertical section through a modified valve showing a modified resilient filling plug disposed in filling position, Fig. 6 is a partial view of Fig. 5 showing the modified filling plug seated in place in closed position during spray formation, Fig. 7 is a section view showing the location of the modified filling plug during the filling operation of the metered valve reservoir, Fig. 8 is a perspective view of the resilient filling plug of Figs. 5 to 7, Fig. 9 is a vertical section through a modified metering spray valved and filling head, said valve having a filling ball valve disposed in closed position, and Fig. 10 is a partial view of the valve stem of Fig. 9 showing the filling valve ball disposed in the filling or open position.

Referring to Fig. 1 a pressure resistant container 10 adapted to dispense a propellant spray, for example a perfumed spray, is provided with a metering spray valve 11 and a preferably plastic dip tube 12 secured thereto. A finger pressure plate 13 is disposed upon a valve plunger and provided with a conduit 14 for directing a spray of liquid propellant.

The valve 11 is shown in section in Figs. 2 and 3 and consists of a generally tubular housing 15 provided with exteriorly disposed screw threads 16 adapted to engage mating threads disposed in an aperture in container 10 (Fig. 1).

A generally rod-shaped plunger 17 is moveably secured within the valve housing and held in fluid tight sealed relationship by a resilient sealer ring 18 disposed about the plunger stem and clamped within the housing 11 by means of a turned apertured dome 19.

The tubular chamber of the valve housing 11 is provided with an inset shoulder 20 adapted to engage securingly a corresponding shoulder disposed on dip tube 12.

The rod-like plunger 17 has a conduit 21 disposed axially therein and a lateral conduit 22 leading thereto. The plunger is provided with a cylindrical midsection 23 of a diameter greater than the rod sections disposed thereabove and therebelow. The lower extremity of the plunger 17 is provided with a series of set-backs giving it the outward appearance of an extended telescope. A series of three set-backs 24, 25 and 26 is preferred with a beveled shoulder 27 and 28 respectively located therebetween. The conduit of dip tube 12 is provided with a curvatured edge 29 adapted to effect a valve closure with plunger 17.

The plunger extremity being of a small diameter 24 and disposed in the conduit of dip tube 12 permits passage of liquid propellant therebetween, whereas when cylinder 25 is inserted in the dip tube, a liquid-tight but not gas-tight passageway is effected. Complete gas-tight closure of the conduit of tube 12 is made by engaging beveled shoulder 28 with curvatured edge 29 of the dip tube 12.

The plunger and its medially located cylinder 23 is disposed in the tubular chamber of housing 15 and a coil spring 30 is disposed around the lower plunger rod section between cylinder 23 and a washer 31 located on the rim of tube 12. The coil spring 30 is thus disposed in a reservoir chamber adapted to hold a definite or metered amount of propellant. The cylinder 23 is loosely fitted in the tubular chamber of the valve housing 15 thereby permitting passage of propellant therebetween when the plunger 17 is fully depressed.

The plunger 17 is depressable so that the lateral conduit 22 may be pushed below the sealing gasket 18, at the same time that a gradual and selective sealing off of the propellant supply in dip tube 12 is being effected, whereupon the metered amount of propellant containing perfume or other suitable ingredients in the reservoir chamber is permitted to vaporize and thereafter leave said reservoir chamber through conduits 22 and 21. The valve closure of the tube 12 is so adjusted, that the liquid propellant in tube 12 forces out the contents of the reservoir chamber immediately before gas-tight seal is made between beveled shoulder 28 and the curvatured edge 29 of the dip tube 12.

An important feature of this invention is the novel valve and the mthod of filling containers provided with said valve.

A resilient insert 37 (Fig. 4) of rubber or plastic having a generally cylindrical configuration is preferably provided with a substantially medially disposed annular tire section 37X.

The insert 37 is provided at its bottom with a tubular cavity preferably with the base 33 of the cavity disposed above tire section 37X. An inverted V-shaped slot 34 is made in the cavity wall of the insert to permit passage of liquid propellant into the cavity during the filling operation.

In filling a container with liquid propellant having the valve of this invention (Fig. 2), a filling head 35 is provided with a valve plunger receiving cavity 36 and a tubular chamber 38 adapted to receive a reciprocally operable filling head finger 38X. The finger 38X is of a diameter significantly less than the diameter of the tubular chamber 38 to permit passage of liquid therebetween and adapted to be inserted into conduit 21. The filling head 35 is further provided with a lateral conduit 39 communicating with a source of supply of liquid propellant and said chamber 38.

In the filling of a container having a valve 11 fixedly secured thereto the filling head 35, having a resilient sealer gasket 40 disposed in an annular groove in its base, is depressed until the gasket 40 snugly engages the dome 19 and the top of plunger 17 engages the base 41 of the filling head cavity 36. A rubber insert 37 is partly inserted into tubular filling head cavity 38 and the liquid propellant is pumped through conduit 39 and cavity 38 and then through slot 34 into the plunger conduit 21 and thence into dip tube 12 and container 10 (Fig. 2).

After the desired amount of liquid propellant has been introduced into the assembled valved container, the insert 37 is forced into the plunger conduit 21 by downward movement of finger 38X preferably until tire 37 emerges beyond the extreme tip of the bottom section of plunger 17 thereby allowing the tire section 37X to expand to its unconfined condition with the tire section 37X disposed exteriorly of conduit 21, thus preventing the blow-out of the insert due to the back pressure of propellant in the container. The insert 37 is frictionally held in this protruding position by the gripping action produced between the top insert section and the walls of the conduit 21 which are of lesser diameter (Fig. 3).

Alternately, the insert may be pushed into the conduit 21 of plunger 17 until the top thereof passes beyond the lateral conduit 22 as shown in dotted outline in Fig. 3. In this position the insert plugs the conduit with a vise-like grip since the tire section 37X is compressed until it appears to be merged with the top and bottom cylindrical walls of the insert. Since the cavity of the insert has its base above tire section 37X the insert is yieldable to tire compression pressure at this point.

A modified stem-filling metering spray valve is shown in Figs. 5 to 8 inclusive. In this modification an upright plug 42 (Fig. 8) is adapted to be frictionally disposed in the bottom outlet of conduit 21 of the plunger 17. The plug 42 is provided with a cylindrical base 43 and a cylindrical column 44 of lesser diameter than that of the base but of slightly greater diameter than that of the conduit 21 into which column 44 is snugly inserted. The column 44 is provided with a channel 45 extending longitudinally thereof.

In this modification of the filling valve of this invention, the plug 42 is only partly inserted into the conduit 21 so that the channel 45 is disposed substantially about half within the plunger 17 and the remainder therebelow (Fig. 5).

In the modification shown in Figs. 5 to 8, the dip tube 12 is provided with a chamber 46 having a bottom apertured wall 47, the height of the chamber being sufficient to permit plunger 17 to firmly engage the top rim of plug base 43 (Fig. 6), thereby forcing the plug 42 into a closed fluid-tight position.

The base 43 of plug 42 is of lesser diameter than that of dip tube cylindrical chamber 46 so that in the filling of the container 10 through a valve 11 secured thereto (Fig. 5) the liquid propellant passes through filling head tubular cavity 38, thence into conduit 21 of plunger 17 and through channel 45 of the plug 42 and then between the wall of cavity 46 and base 43 of plug 42 and finally into the conduit of dip tube 12.

Lowering of filling head plunger 40X, which is of a diameter greater than that of the top section of plunger 17, causes the valve plunger 17 to descend against the action of coil spring 30 (Fig. 6) to seat the plug 42 into the closed gas-tight position.

The diameter of the base 43 of plug 42 is preferably that of the smallest diameter of the set-back cylindrical sections forming the telescope-like configuration of the plunger bottom thus permitting fluid propellant to pass into the valve reservoir (Fig. 7).

The plunger conduit 21 of this modification may be of uniform tubular diameter or of varying diameter to effect a plunger top section with a larger bearing surface upon which plunger 40X may press.

A third modification of this invention is shown in Figs. 9 and 10, in which no filling head plunger is used. In this modification the plunger 17 is modified to contain a captively held ball valve.

The plunger is made in two sections, a top section 48 having a ball receiving cavity 49X in communication with a plunger conduit 21X.

The walls forming the cavity 49X is provided with one or more, preferably several, longitudinal grooves permitting passage of liquid propellant around the valve ball 50, loosely and hence floatably held in cavity 49X.

The bottom section 49 of the plunger of this third illustrative modification is provided with a cup cavity having a circular groove or undercut 51 in the cavity wall adjacent the cup cavity base. The purpose of this undercut is to permit locking of sections 48 and 49 together. This is done by placing the bottom of plunger section 48 in the cup cavity of plunger section 49 and peening or hitting the top of section 48 a sharp blow to expand the base thereof to fill the groove 51.

The bottom plunger section 49 is provided with an orifice having one or more, preferably several, slots 52 cut in the orifice rim to permit passage of fluid propellant around a ball 50 resting upon the orifice grid formed by the metal walls of slots 52.

During the filling operation (Fig. 10) the ball 50 rests upon the grid formed by slots 52 and the liquid propellant from cavity 38 of filling head 53 is fed through conduit 21X around ball 50 through the grooves in the walls of cavity 49 and thence through the slots 52 into the conduit of the lower plunger section 49 and finally into dip tube 12 and container 10.

Figure 9 shows the ball valve in closed position after filling of a container 10 secured to the spray valve. The internal pressure of the propellant forces the ball upward into liquid-tight engagement with the edge of conduit 21X.

All the filling valves of this invention are capable of use in the re-filling of a spray container. In the modification of Figs. 2 and 3 the insert 37 could be downwardly pushed by a plunger like that of plunger 38X so that it would drop away from the plunger conduit 21 into the dip tube and thence into the container 10. The presence of a small insert 37 on the bottom of a re-filled container would not effect the operation of the valve nor significantly effect the capacity of the container 10.

In re-filling the valve of Figs. 5 to 8 the plug 42 is merely depressed by a suitable plunger disposed in conduit 21 from its closed position (Fig. 7) to its open filling position (Fig. 5). After filling the plug 42 is again seated into the closed position as previously described (Fig. 6).

In the modification of Figs. 9 and 10 the ball 50 drops due to gravitational force whenever the propellant supply in the container 10 is exhausted. In this position the ball valve is ready for filling, the force of the pumped filling stream of propellant being sufficient to keep the ball down until the pumped stream of propellant is disengaged, whereupon the ball 50 is forced by the internal pressure of the propellant in the container into its closed position (Fig. 9).

This invention has been illustrated by various embodiments. Clearly its generic scope embraces all these embodiments as defined in the claims herein.

I claim:

1. A filling spray metering valve adapted for securing to a pressure resistant container comprising a valve housing having a generally tubular cavity therethrough, a longitudinal plunger having a generally tubular axial conduit disposed in and secured to said valve housing and forming a metering chamber therebetween, means disposed in said metering chamber for urging said plunger outwardly and plug means moveably disposed in said plunger conduit for effecting an inlet flow of liquid propellant mixture, whereby said container may be filled through said valve.

2. A re-fillable filling spray valve comprising a tubular valve housing, a tubular plunger reciprocally disposed in said housing, a dip tube having a cup-cavity and secured in said housing and adapted to receive the plunger terminus in said cup-cavity and an upright resilient plug having a slot therein adapted to be disposed partly in said plunger tube in said dip tube cup-cavity for permitting flow of liquid propellant through the plunger and into the dip tube, said plug being adapted to be seated in said plunger tube in liquid tight relationship.

3. A metering spray valve adapted for filling propellant therethrough, comprising a valve housing having a tubular cavity therethrough, a depressable plunger disposed in the tubular cavity of said housing and adapted to form a reservoir chamber therebetween, said plunger having an axial tubular passageway therethrough for transporting liquid propellant into and through said valve, and plug means having a channel therein moveably disposed in said tubular passageway for effecting initially flow of liquid propellant through said channel into said valve and adapted thereafter for final plugging up of said passageway.

4. A spray valve adapted for dispensing a metered amount of material and for filling a container through a plunger thereof comprising a tubular valve housing adapted for securing hermetically to said pressure resistant container, an axial conduit plunger disposed loosely and slidingly within said tubular valve housing forming a reservoir chamber therebetween, said plunger having a top plunger section having a lateral port communicating with said axial conduit, a bottom plunger section having a telescopic configurated valve seat and a middle cylindrical plunger section having a diameter slightly less than the diameter of the tube of said valve housing and disposed therein, spring means disposed about said plunger for actuating same and resilient filling means having a groove therein adapted to be disposed partly in said axial conduit during the filling operation to effect liquid communication between the plunger axial conduit and the outside space through said groove, said filling means being further adapted to be inserted into said axial conduit after the filling operation to completely receive said groove thereby cutting-off liquid communication through said groove.

5. A valve plunger assembly adapted to be disposed in a valve housing secured to a pressure resistant container and adapted to dispense a metered spray and further adapted to effect filling of the container therethrough comprising an integral plunger having an axial conduit therethrough consisting of a top elongated plunger section having a lateral exit valve port at its base communicating with said conduit, an enlarged middle plunger section and a bottom elongated plunger section having an exteriorly disposed valve closure having a stepped back appearance; and resilient elongated means having a partial groove in the side thereof and adapted to fit frictionally in said axial conduit with the groove extending beyond the end opening of said conduit and further adapted to be ultimately inserted into said conduit to effect a hermetical seal thereof.

References Cited in the file of this patent
UNITED STATES PATENTS

| | | |
|---|---|---|
| 2,401,391 | Vale | June 4, 1946 |
| 2,584,063 | Suellentrop | Jan. 29, 1952 |
| 2,667,991 | Boyer | Feb. 2, 1954 |
| 2,684,806 | McBean | July 27, 1954 |
| 2,693,983 | Howell | Nov. 9, 1954 |
| 2,708,347 | Cameron | May 17, 1955 |